Patented Oct. 2, 1951

2,569,960

UNITED STATES PATENT OFFICE 2,569,960

ACETONE-SOLUBLE UNSATURATED INTERPOLYMER OF A DI-2-ALKENYL ITACONATE, A STYRENE, AND A 2-ALKENYL CHLORIDE

Pliny O. Tawney, Passaic, N. J., assignor to United States Rubber Company, New York, N. Y., a corporation of New Jersey No Drawing. Application May 21, 1948,
Serial No. 28,526

6 Claims. (Cl. 260—78.5)

My invention relates to a new class of soluble, unsaturated polymeric materials obtained by the interpolymerization of a di-2-alkenyl itaconate with styrene or a substituted styrene as hereinafter defined and with a 2-alkenyl chloride. These new ternary interpolymers can be converted in the presence of heat and/or catalyst to an insoluble, infusible state by further polymerization or by copolymerization with other polymerizable olefinic compounds.

My new interpolymers are supplementary to the copolymers of a di-2-alkenyl itaconate and a 2-alkenyl chloride disclosed in a copending application Serial Number 28,525, filed on even date herewith and fulfill a need for a more flexible interpolymer of higher dielectric strength as well as greater compatibility with hydrocarbon solvents, the latter property being particularly significant in the preparation of cheap coating compositions.

As is well known, the copolymerization of di-2-alkenyl esters such as diallyl itaconate with styrene results in the formation of insoluble gels before more than a minor proportion of the monomeric materials, particularly di-2-alkenyl esters, have been converted to the polymeric form. The product, which usually consists of a heterogeneous mixture of insoluble copolymers, unreacted monomers and some low molecular weight polymer, is difficult to manipulate in subsequent processing operations and is virtually useless in many industrial applications such as coating, laminating, impregnating, and molding operations which require a soluble, fusible resin capable of ultimate conversion to a solvent and heat-resistant state. Consequently the copolymers of such di-2-alkenyl esters have enjoyed but little commercial utility although the prior art has continually attempted to circumvent the above-mentioned disadvantages.

These prior art methods are essentially identical in that they all entail halting the copolymerization before gelatin occurs in order to secure a soluble product. However, on an industrial scale, the proposed use of high reaction temperatures, polymerization inhibitors, large amounts of diluents and/or catalysts, etc. for delaying gelation, not only involve additional time and expense but actually effect only a disproportionately small improvement in the yield of ungelled copolymer. Hence the large amounts of unreacted monomer must still be isolated and recycled for use in subsequent polymerizations and the copolymer itself must be intensively purified to remove solvents, catalyst fragments, inhibitors, gel, etc., prior to commercial use.

I have now discovered a method whereby the prior art difficulties can be successfully overcome and a major proportion of a mixture of styrene and a di-2-alkenyl itaconate can be readily converted to the copolymeric form without premature insolubilization.

In contrast to prior art methods, the interpolymerization of my invention proceeds smoothly at moderate temperatures and in the absence of solvents, inhibitors, or those special reaction conditions and precautions heretofore employed by the art in an attempt to delay or avert gelation. Moreover, the soluble, unsaturated interpolymers of my invention are of uniform and homogeneous character since they are uncontaminated by the insoluble gel frequently encountered in prior art copolymers of styrene and a di-2-alkenyl itaconate, and hence extensive purification of my products is unnecessary.

The method of my invention comprises interpolymerizing a di-2-alkenyl itaconate with a mixture of from 0.1 to 6 or more molar equivalents of styrene or a substituted styrene as hereafter defined and from 0.1 to 10 or more molar equivalents of a 2-alkenyl chloride at temperatures in the range of 25–120° C., preferably 50–110° C. and for time sufficient to effect an adequate degree of reaction, e. g., 1 to 100 hours.

The interpolymerization reaction of my invention is promoted by a source of free radicals such as a peroxide, including organic peroxides, e. g., acetyl peroxide, benzoyl peroxide, and tert.-butyl hydroperoxide, such promoters being usually employed in amounts of 0.1–20%, and preferably 1.0–15%, by weight of the reactant mixture. Any organ peroxide capable of catalyzing polymerization of unsaturated organic compounds may be used in the practice of my invention.

The di-2-alkenyl itaconates which are operable in my invention include the itaconic acid esters of 2-alkenyl alcohols having the structural formula $(R)CH=C(R')-CH_2OH$ where R is selected from the group consisting of hydrogen, chloromethyl, lower alkyl and phenyl and where R' is selected from the group consisting of hydrogen, chlorine, chloromethyl, hydroxymethyl and lower alkyl, such as allyl, 2-methallyl, 2-ethallyl, 2-chloroallyl, 2-(hydroxymethyl) allyl, 2-(chloromethyl) allyl, tiglyl, crotyl, 4-chorocrotyl and cinnamyl alcohols. Itaconic acid esters of the 2-alkenyl alcohols containing a terminal methylene group (i. e., where R in the foregoing formula is hydrogen, R' being as just stated) are preferred, itaconic acid esters of allyl and methallyl alcohols being particularly preferred.

I prefer to use styrene in the practice of my invention. However I may replace the styrene in whole or in part by alpha-methyl styrene or a styrene which is nuclearly substituted with lower alkyl, lower alkoxy, halogen or lower haloalkyl, examples being p-methylstyrene, p-methoxystyrene, p-chlorostyrene, o,p-dichlorostyrene, p-trichloromethylstyrene, p-fluorostyrene and p-trifluoromethylstyrene.

Suitable 2-alkenyl chlorides include the 2-alkenyl chlorides having the structural formula $(R)CH=C(R')-CH_2Cl$ where R is selected from the group consisting of hydrogen, chloromethyl, lower alkyl and phenyl and where R' is selected from the group consisting of hydrogen, chlorine, chloromethyl, hydroxymethyl and lower alkyl, such as allyl, 2-methallyl, 2-ethallyl, 2-chloroallyl, 2-(hydroxymethyl) allyl, 2-(chloromethyl) allyl, tiglyl, crotyl, 4-chlorocrotyl and cinnamyl chlorides. Those 2-alkenyl chlorides which contain a terminal methylene group (i. e., where R in the foregoing formula is hydrogen, R' being as just stated) are preferred, examples being allyl chloride, 2-methallyl chloride, 2,3-dichloropropene (2-chloroallyl chloride) and 2-(chloromethyl) allyl chloride. Other 2-alkenyl halides such as methallyl fluoride, allyl bromide and allyl iodide, are operable in my invention but to a lesser and varying degree. The 2-alkenyl bromides and iodides suffer the additional disadvantage of imparting poor color stability to the resulting copolymers in many cases, particularly at elevated temperatures. The chlorides are most highly preferred.

The course of interpolymerization can be followed by observing the increase in viscosity of the reaction mixture, and the resulting interpolymers can be isolated from the reaction mixture by distilling off any unreacted starting materials or by extracting them with a solvent in which the interpolymers themselves are insoluble. Although it is unnecessary for many commercial applications, my products can be further purified by repeated solution in a solvent such as acetone and re-precipitation with a non-solvent, e. g., n-hexane.

The resulting polymeric materials can be cast or molded in a known manner and in various shapes such as rods and sheets. Alternatively, my new interpolymers can be dissolved in a variety of organic solvents and employed as coating, laminating and impregnating compositions. In the preparation of such solutions it is often unnecessary to isolate my interpolymers since higher-boiling solvents can be added directly to the crude interpolymerization reaction mixture and any volatile unreacted starting materials can be subsequently removed by fractional distillation.

Application of heat to compositions containing my unsaturated interpolymers, particularly in the presence of a polymerization catalyst, induces further polymerization and the resulting cross-linked products are quite indifferent to heat and are strongly resistant to attack by solvents. Various inert addends including dyes, pigments, fillers, plasticizers, can be incorporated with my interpolymers at the soluble, fusible stage prior to the final cure.

My interpolymers can also be converted to solvent and heat resistant products by copolymerization with polymerizable ethylenic compounds, e. g., tolyl acrylate, butyl methacrylate, vinyl butyrate, allyl acrylate, diethyl fumarate and diallyl fumarate. My products dissolve readily in a number of these ethylenic compounds to yield solutions which can be totally polymerized leaving no solvent to be evaporated. Such solutions are particularly useful for casting and laminating operations wherein the article must be pre-formed and then "set" or cured in the final shape with a minimum of shrinkage and distortion.

The solutions of my interpolymers in both inert and the polymerizable type solvents mentioned above are especially useful since as a consequence of the chlorine content of the interpolymers they may be employed to impart flame-retardant properties to various porous and flammable materials including wood and textiles.

The following examples disclose my invention in more detail. All parts are by weight.

*Example I*

To demonstrate the advantages of my invention, mixtures of diallyl itaconate and styrene are interpolymerized at 60° C. with various 2-alkenyl chlorides, in the presence of benzoyl peroxide, to the points of incipient gelation or until no further increases in the viscosities of the reaction mixtures are observed. The polymeric products are then isolated and purified by pouring the reaction mixtures into an excess of n-hexane. The interpolymers are then re-dissolved in a minimum of acetone, re-precipitated by the addition of n-hexane and then dried in vacuo to constant weight. In Table I below are summarized the amounts of the monomeric starting materials, peroxide and the polymeric products as well as the reaction times required to attain the points of incipient gelation in each case. To emphasize the advantage of my invention over the prior art the copolymerization of styrene with diallyl itaconate in the absence of 2-alkenyl chloride is also included (I–a).

TABLE I

| | Diallyl Itaconate (Parts) | Styrene (Parts) | 2-Alkenyl-Chloride | | Benzoyl Peroxide (Parts) | Reaction Time (hours) | Polymeric Product (Parts) |
|---|---|---|---|---|---|---|---|
| | | | | Parts | | | |
| a | 100 | 25 | | | 0.80 | 6.50 | 18.1 |
| b | 100 | 25 | Allyl Chloride | 10 | 0.80 | 7.50 | 23.2 |
| c | 100 | 25 | ----do---- | 100 | 4.0 | 14.50 | 71.9 |
| d | 100 | 25 | ----do---- | 200 | 6.0 | 25.67 | 135.0 |
| e | 100 | 25 | Methallyl Chloride | 100 | 4.0 | 9.90 | 119.0 |
| f | 100 | 25 | 2,3-Dichloropropene | 100 | 4.0 | [1] 48.0 | 111.5 |
| g | 100 | 25 | 2-(Chloromethyl) allyl chloride | 100 | 4.0 | 19.0 | 67.8 |

[1] No evidence of incipient gelation.

By comparison of Example I—a with I—b it is apparent that the presence of even a small amount of a 2-alkenyl chloride is sufficient to effect a significant increase in the amounts of the monomeric styrene and diallyl itaconate which are converted to the soluble, polymeric form before gelation. Succeeding examples such as I—d illustrate the high yields of soluble interpolymers which can be obtained by the method of my invention and in which the major proportion of the diallyl itaconate and styrene are converted to the soluble polymeric form.

Example 2

Diallyl itaconate is admixed with 25.0% by weight of styrene, 22.5% of 2,3-dichloropropene and 4.0% of benzoyl peroxide. The mixture is heated at 60° C. for 48 hours. The reaction product is then isolated and purified in the manner of Example 1 above, the weight of the final dry interpolymer corresponding to approximately a 50% yield.

Analysis—Found: % Cl, 13.26; iodine number (Wijs) 102.

The halogen content measures the amount of interpolymerized 2,3-dichloropropene, while the unsaturation extant, as indicated by the iodine number, is derived from the interpolymerized diallyl itaconate.

Five parts of the interpolymer are dissolved in a solution of 4 parts of xylene and 1 part of n-butanol and a film is poured on a glass plate. The film is tack-free after baking 1.5 hours at 60° C. and hard after an additional 1.25 hours at 60° C. The film is post-cured at 140° C. for 1.5 hours to yield a clear hard coating which is resistant to attack by ethanol, acetone and xylene.

Having thus described my invention, what I claim and desire to protect by Letters Patent is:

1. An acetone-soluble, fusible, unsaturated ternary interpolymer of monomers consisting solely of a monomeric itaconic acid di-ester of a 2-alkenyl alcohol having the formula $$(R)CH=C(R')-CH_2OH$$

where R is selected from the group consisting of hydrogen, chloromethyl, lower alkyl and phenyl and R' is selected from the group consisting of hydrogen, chlorine, chloromethyl, hydroxymethyl and lower alkyl, a styrene selected from the group consisting of styrene, alpha-methyl styrene and styrenes nuclearly substituted with radicals selected from the group consisting of lower alkyl, lower alkoxy, halogen and lower haloalkyl, and a monomeric 2-alkenyl chloride having the formula $$(R)CH=C(R')-CH_2Cl$$

where R and R' are as before, the amount of said styrene being equal to from 0.1 to 6 mols thereof per mol of said itaconic acid di-ester and the amount of said 2-alkenyl chloride being equal to from 0.1 to 10 mols thereof per mol of said itaconic acid di-ester, said interpolymer being capable of undergoing further polymerization to insoluble, heat-resistant form upon heating in the presence of a peroxidic polymerization catalyst.

2. An acetone-soluble, fusible, unsaturated interpolymer of monomers consisting solely of monomeric diallyl itaconate, monomeric styrene and monomeric allyl chloride, the amount of said styrene being equal to from 0.1 to 6 mols thereof per mol of said diallyl itaconate and the amount of said allyl chloride being equal to from 0.1 to 10 mols thereof per mol of said diallyl itaconate, said interpolymer being capable of undergoing further polymerization to insoluble, heat-resistant form upon heating in the presence of a peroxidic polymerization catalyst.

3. An acetone-soluble, fusible, unsaturated, interpolymer of monomers consisting solely of 100 parts of monomeric diallyl itaconate, 25 parts of monomeric styrene and 100 parts of monomeric allyl chloride, said interpolymer being capable of undergoing further polymerization to insoluble, heat-resistant form upon heating in the presence of a peroxidic polymerization catalyst.

4. The process of making an acetone-soluble, fusible, unsaturated interpolymer which comprises heating a mixture of monomers consisting solely of monomeric itaconic acid di-ester of a 2-alkenyl alcohol having the formula $$(R)CH=C(R')-CH_2OH$$

where R is selected from the group consisting of hydrogen, chloromethyl, lower alkyl and phenyl and R' is selected from the group consisting of hydrogen, chlorine, chloromethyl, hydroxymethyl and lower alkyl, a monomeric styrene selected from the group consisting of styrene, alpha-methyl styrene, and styrenes nuclearly substituted with radicals selected from the group consisting of lower alkyl, lower alkoxy, halogen and lower haloalkyl, and a monomeric 2-alkenyl chloride having the formula $$(R)CH=C(R')-CH_2Cl$$

where R and R' are as before, the amount of said styrene being equal to from 0.1 to 6 mols thereof per mol of said itaconate acid di-ester and the amount of said 2-alkenyl chloride being equal to from 0.1 to 10 mols thereof per mol of said itaconate acid di-ester, at a temperature of from 25° to 120° C. in the presence of a peroxidic polymerization catalyst and thereby effecting conversion of a substantially greater amount of said itaconate acid di-ester and said styrene to soluble, polymeric form than would be so converted in the absence of said 2-alkenyl chloride.

5. The process of making an acetone-soluble, fusible unsaturated interpolymer which comprises heating a mixture of monomers consisting solely of monomeric diallyl itaconate, monomeric styrene and monomeric allyl chloride, the amount of said styrene being equal to 0.1 to 6 mols thereof per mol of said diallyl itaconate and the amount of said allyl chloride being equal to 1.0 to 10 mols thereof per mol of said diallyl itaconate, at a temperature of from 25° to 120° C. in the presence of an organic peroxide polymerization catalyst and thereby effecting conversion of a substantially greater amount of said diallyl itaconate and said styrene to soluble polymeric form than would be so converted in the absence of said allyl chloride.

6. The process of making an acetone-soluble fusible, unsaturated interpolymer which comprises heating a mixture of monomers consisting solely of 100 parts of monomeric diallyl itaconate, 25 parts of monomeric styrene and 100 parts of monomeric allyl chloride at a temperature of from 50° to 110° C. in the presence of an organic peroxide polymerization catalyst and thereby effecting conversion of a considerably greater amount of said diallyl itaconate and said styrene to soluble polymeric form than would be so converted in the absence of said allyl chloride.

PLINY O. TAWNEY.

REFERENCES CITED

The following references are of record in the file of this patent:

UNITED STATES PATENTS

| Number | Name | Date |
|---|---|---|
| 2,221,663 | Rothrock | Nov. 12, 1940 |
| 2,378,195 | D'Alelio | June 12, 1945 |
| 2,431,373 | D'Alelio | Nov. 25, 1947 |
| 2,498,084 | Kuderna et al. | Feb. 21, 1950 |
| 2,498,099 | Tawney et al. | Feb. 21, 1950 |